(12) United States Patent
Hansen et al.

(10) Patent No.: US 9,170,090 B2
(45) Date of Patent: Oct. 27, 2015

(54) METHOD FOR ESTIMATING VOLUME

(75) Inventors: Torben Winther Hansen, Aakirkeby (DK); Knud-Erik Larsen, Nexø (DK)

(73) Assignee: INS-EUROPE, Aakirkeby (DK)

(*) Notice: Subject to any disclaimer, the term of this patent is extended or adjusted under 35 U.S.C. 154(b) by 0 days.

(21) Appl. No.: 14/111,928

(22) PCT Filed: Apr. 15, 2011

(86) PCT No.: PCT/DK2011/050123
§ 371 (c)(1),
(2), (4) Date: Nov. 26, 2013

(87) PCT Pub. No.: WO2012/139575
PCT Pub. Date: Oct. 18, 2012

(65) Prior Publication Data
US 2014/0071430 A1    Mar. 13, 2014

(51) Int. Cl.
*G01C 3/08*     (2006.01)
*G01B 11/02*    (2006.01)
*B66F 9/075*    (2006.01)
*G01B 11/00*    (2006.01)

(52) U.S. Cl.
CPC ............ *G01B 11/026* (2013.01); *B66F 9/0755* (2013.01); *G01B 11/00* (2013.01)

(58) Field of Classification Search
CPC ...... B66F 9/0755; G01B 11/00; G01B 11/026
USPC .............. 356/3.01–3.16, 4.01–4.1, 5.01–5.5, 356/627, 639, 640, 606–608, 379
See application file for complete search history.

(56) References Cited

U.S. PATENT DOCUMENTS

| | | | | |
|---|---|---|---|---|
| 5,042,015 A | * | 8/1991 | Stringer | 367/99 |
| 5,105,392 A | * | 4/1992 | Stringer et al. | 367/99 |
| 5,606,534 A | * | 2/1997 | Stringer et al. | 367/128 |
| 5,831,719 A | * | 11/1998 | Berg et al. | 356/5.13 |
| 5,850,370 A | * | 12/1998 | Stringer et al. | 367/128 |

(Continued)

FOREIGN PATENT DOCUMENTS

| DE | 19519741 A1 | 12/1996 |
|---|---|---|
| DE | 102006054083 | 5/2008 |

(Continued)

OTHER PUBLICATIONS

International Search Report PCT/ISA/210 for International Application No. PCT/DK2011/050123 Dated on Apr. 15, 2011.

(Continued)

*Primary Examiner* — Luke Ratcliffe
*Assistant Examiner* — Assres H Woldemaryam
(74) *Attorney, Agent, or Firm* — Harness, Dickey & Pierce, P.L.C.

(57) ABSTRACT

A cargo handling vehicle comprising a mast and a lifting device movable along said mast. The cargo handling vehicle comprises a range sensor located on said cargo handling vehicle at a position suitable for measuring the distance to the top of a piece of cargo. The cargo handling vehicle also comprises means for calculating a calculated height of said piece of cargo with respect based on said distance to the top of the piece of cargo, and means for calculating the estimated volume of said piece of cargo based on said known length and width and said calculated height. The cargo handling vehicle is used in a method for calculating the estimated volume of said piece of cargo.

20 Claims, 3 Drawing Sheets

(56) References Cited

U.S. PATENT DOCUMENTS

Figure 1:
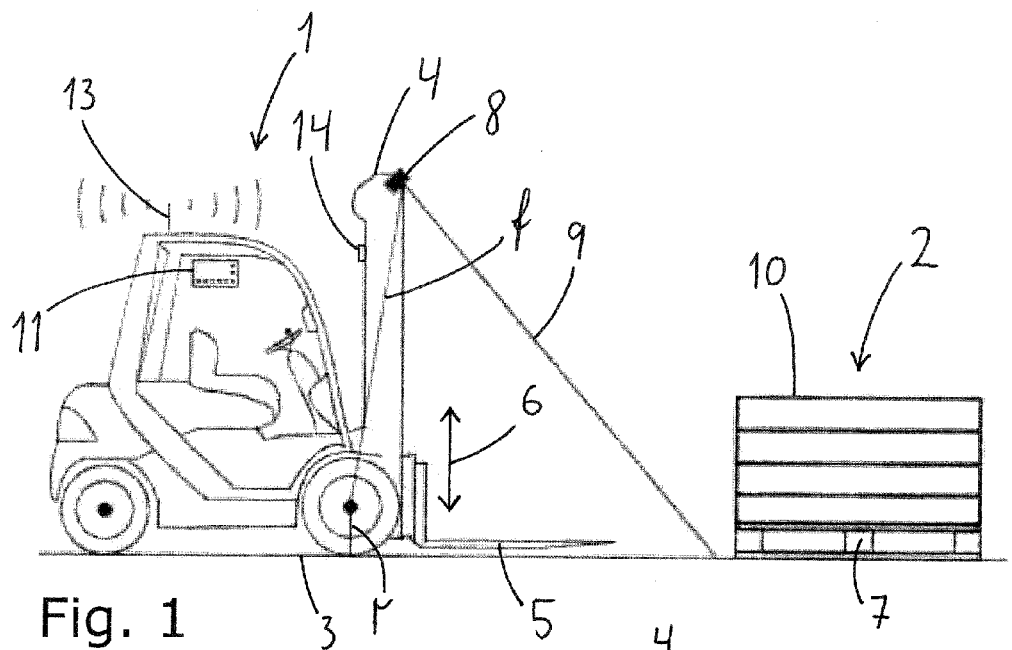

| | | | |
|---|---|---|---|
| 5,940,170 A * | 8/1999 | Berg et al. | 356/5.1 |
| 6,115,114 A * | 9/2000 | Berg et al. | 356/5.13 |
| 6,298,009 B1 * | 10/2001 | Stringer | 367/99 |
| 6,611,787 B2 * | 8/2003 | Stringer et al. | 702/159 |
| 6,850,464 B2 * | 2/2005 | Taylor et al. | 367/99 |
| 7,527,205 B2 * | 5/2009 | Zhu et al. | 235/462.14 |
| 7,912,575 B2 * | 3/2011 | Arnell | 700/228 |
| RE42,430 E * | 6/2011 | Carlsruh et al. | 367/99 |
| 8,064,684 B2 * | 11/2011 | Ratti et al. | 382/154 |
| RE44,238 E * | 5/2013 | Cooper et al. | 33/1 V |
| 8,466,380 B2 * | 6/2013 | Inoue et al. | 177/25.13 |
| 2002/0082802 A1 * | 6/2002 | Stringer et al. | 702/159 |
| 2004/0151068 A1 * | 8/2004 | Carlsruh et al. | 367/99 |
| 2009/0059004 A1 * | 3/2009 | Bochicchio | 348/148 |
| 2009/0251709 A1 * | 10/2009 | Kindlein | 356/608 |
| 2010/0091094 A1 * | 4/2010 | Sekowski | 348/50 |
| 2010/0191662 A1 * | 7/2010 | Lytle | 705/325 |

FOREIGN PATENT DOCUMENTS

| | | |
|---|---|---|
| WO | WO-2006128454 A1 | 12/2006 |
| WO | WO-2010045391 A2 | 4/2010 |

OTHER PUBLICATIONS

International Written Opinion PCT/ISA/237 for International Application No. PCT/DK2011/050123 Dated on Apr. 15, 2011.

* cited by examiner

METHOD FOR ESTIMATING VOLUME

This application is the national phase under 35 U.S.C. §371 of PCT International Application No. PCT/DK2011/050123 which has an International filing date of Apr. 15, 2011.

The present invention relates to a method for estimating a volume, in particular but not exclusively in connection with palletized cargo handling.

In cargo handling, the shipping charges have traditionally been based on volume and not on weight, even though weight is quite easily determined, and may accordingly readily be verified by any party involved in the shipping to ensure correct invoicing, i.e. the shipper, the receiver or the cargo handler. In this respect WO-A-2006/128454 discloses a method where weighing may be performed by a fork-lift truck during handling of palletized cargo.

The reason for the invoicing per volume appears to be that often the limiting capacity in transportation is not the weight but the volume, and accordingly cargo handlers have an interest in invoicing per volume. Volume is however not so readily determined, and the most common approach in this respect have been to introduce volumetric scanning stations where the cargo is being handled, e.g. a yard or a warehouse. Volumetric scanning stations, however, interfere with the natural flow of the cargo operations. Picking up cargo using a fork-lift truck and taking it to a volumetric scanning station is an additional and time consuming operation, as compared to simply picking it up and loading it on the carrier.

These problems are well known and inter alia described in WO-A-2010/045391, which suggests the use of 3D cameras mounted on a fork-lift truck for performing the 3D scan and calculation of an estimated volume. The term estimate in this context is used to indicate that it is not an actual volume that is measured, but a shipment volume to be invoiced, i.e. the volume of the bounding box based on height×width×length of the palletized cargo.

Using 3D cameras systems for the volumetric calculation of the estimated volume appears to be unnecessary complex and expensive. Considering that cargo handlers normally operate a substantial number of fork-lift trucks, it would involve a substantial investment if such 3D camera systems were to be retrofitted on existing fork-lift trucks or involve additional costs when investing in new fork-lift trucks fitted with the known 3D camera system.

Based on the above prior art it is the object of the invention to provide an improved volumetric system allowing quick and efficient volume estimation during handling of the cargo. Preferably, but not necessarily, during the handling of the cargo using cargo handling vehicles, such as fork-lift trucks.

According to a first aspect of the invention this object is achieved by a method for estimating a volume of a piece of cargo having a known width and length and a top of an unknown height, said method comprising the steps of providing a range sensor on a cargo handling vehicle having a lifting device, placing said piece of cargo on a surface, having a predetermined measuring distance from said range sensor, directing the range sensor towards the top of said piece of cargo, measuring the distance to the top of said piece of cargo using the range sensor, calculating a calculated height of said piece of cargo with respect based on said distance, calculating the estimated volume of said piece of cargo based on said known length and width and said calculated height.

This provides a simple and cost efficient way of estimating the volume, which will not interfere with the natural handling routines for the piece of cargo.

According to a second aspect of the invention the object is achieved by cargo handling vehicle comprising a lifting device, wherein said cargo handling vehicle comprises a range sensor located on said cargo handling vehicle at a position suitable for measuring the distance to the top of a piece of cargo, means for calculating a calculated height of said piece of cargo with respect based on said distance to the top of the piece of cargo, and means for calculating the estimated volume of said piece of cargo based on said known length and width and said calculated height.

This provides a cargo handling vehicle which in a simple and cost efficient way may estimate the volume during the natural handling routines for the piece of cargo.

According to a preferred embodiment of the first aspect of the invention, said distance to the top of the cargo is measured automatically when said distance has remained constant within a predetermined interval for a predetermined period of time. This facilitates automated measuring, where the height of the piece of cargo may be during a brief stop during the pick-up of the piece of cargo, e.g. during the insertion of the fork of a fork-lift truck under the pallet of the piece of cargo. If the top of the cargo is sufficiently horizontal over a larger area, it may not even be necessary to stop for taking the measurement.

According to another preferred embodiment of the first aspect of the invention, an automatic measurement is automatically initiated when the lifting device passes a predetermined threshold in the downward direction. This is an efficient way of initiating the measurement because it fits efficiently into the natural handling routines where an empty cargo handling vehicle approaches the piece of cargo with the lifting device at a safe distance above the ground, and the operator then lowers the lifting device for insertion under the pallet.

According to a further preferred embodiment of the first aspect of the invention, said distance measurement to said top of said piece of cargo is preceded by a measurement of said predetermined measuring distance to the surface in order to obtain a distance reference value for said calculation of the calculated height of said piece of cargo. This makes it quite easy to calibrate and recalibrate the reference for the measurement allowing the correct height of the top of the piece of cargo to be calculated from the measured distance to the top of the piece of cargo. This recalibration may easily be performed if the inclination of an essential part of the cargo handling vehicle has changed, e.g. if the cargo handling vehicle is of the type where the lifting device is movable along a mast, and where the inclination of the mast may be changed.

However, according to a yet a further preferred embodiment of the first aspect of the invention, the method may further comprise providing an inclination sensor on said mast along which the lifting device is movable, obtaining from said sensor an inclination value for said mast, and using said inclination value in the calculation of the height of said cargo if the inclination has changed after said distance reference value was measured. In this case the need for recalibration each time the inclination of the mast is changed is obviated.

According to another embodiment of the first aspect of the invention, said estimated volume is multiplied with a predetermined density factor to obtain an estimated weight of said piece of cargo. This makes it possible to readily determine whether the shipping of the piece of cargo should be invoiced per weight or per volume, as the weight itself is readily obtained and therefore usually known.

However, in this respect it is particularly advantageous when according to yet another embodiment of the first aspect of the invention the method comprises the step providing means for determining actual weight of said piece of cargo on said cargo handling vehicle. In that case both estimated weight and actual weight may be determined in the natural handling.

For the invoicing it is furthermore advantageous if at the same time the larger of said estimated weight of said piece of cargo and said actual weight is determined.

According to a particularly preferred embodiment of the invention, a laser range sensor is used as said range sensor. Laser range sensors are readily available at low costs, give the user a precise indication of the measuring point, and are easily installed on e.g. the mast of the cargo handling vehicle of the type where the lifting device is movable along a mast.

According to a preferred embodiment of the second aspect of the invention, the cargo handling vehicle comprising means for detecting when said distance to the top of the piece of cargo has remained constant within a predetermined interval for a predetermined period of time and means for automatically performing said measurement upon expiry of said time period. This allows for the automated taking of a measurement by stopping the motion of the range sensor aiming point over the top of the piece of cargo, or by moving the rangefinder over a horizontal top surface of the piece of cargo.

According to a further preferred embodiment of the second aspect of the invention, the cargo handling vehicle further comprises means for detecting the lifting device passing a predetermined threshold in the downward direction and means for automatically initiating said measurement upon such passage. This allows for automatic initiation of the measuring process when the cargo handling vehicle is approaching the piece of cargo in the usual manner.

According to another embodiment of the second aspect of the invention, the cargo handling vehicle comprises means for a measurement of a predetermined measuring distance to the surface in order to obtain a distance reference value for said calculation of the calculated height of said piece of cargo. In this way the reference value for the calculation may readily be calibrated or recalibrated.

According to yet another embodiment of the second aspect of the invention, the cargo handling vehicle further comprises a mast along which the lifting device is movable and an inclination sensor on said mast for obtaining an inclination value for said mast, and means for calculation of the height of said cargo using said inclination value if the inclination has changed after said distance reference value was measured. This allows the inclination of the mast to be changed and the calculation of the height to be compensated for the change without having to recalibrate the reference value.

According to a further preferred embodiment of the second aspect of the invention, the cargo handling means comprises means for storing a predetermined density factor and means for multiplying said estimated volume with said predetermined density factor to obtain an estimated weight of said piece of cargo. This allows for comparison with the actual weight, which may advantageously also be obtained during normal operation when, according to another embodiment of the second aspect of the invention, the cargo handling vehicle comprises means for determining actual weight of said piece of cargo on said cargo handling vehicle.

According to yet another preferred embodiment according to the second aspect of the invention, the cargo handling vehicle comprises means for determining the larger of said estimated weight of said piece of cargo and said actual weight. This is advantageous in that it allows selective invoicing according to weight or volume, whichever may be favorable for the cargo handler.

According to a particularly preferred embodiment according to the second aspect of the invention, the range sensor is arranged on said mast. This obviates the need for additional masts and moreover allows the range sensor to follow any change in orientation of the mast. This in turn means that as long as the inclination of the mast is known, the height of the top of the piece of cargo may be determined, and a calculation of the estimated volume be performed.

According to yet a preferred embodiment according to the second aspect of the invention, said range sensor is a laser range sensor. Laser range sensors are readily available at low costs, give the user a precise indication of the measuring point, and are easily installed on e.g. the mast of the cargo handling vehicle.

Figure 2:
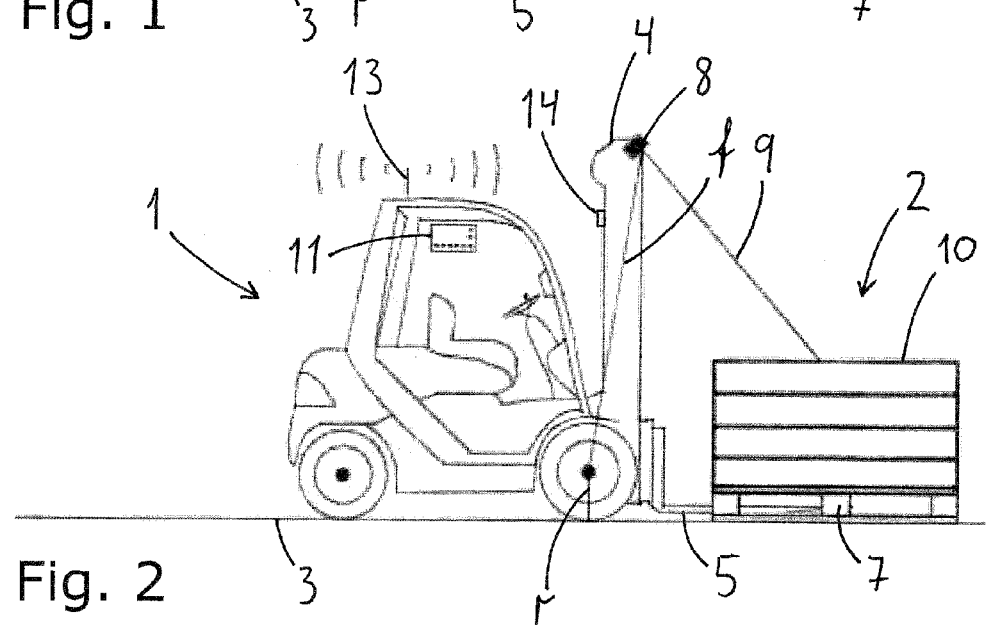
Figure 3:
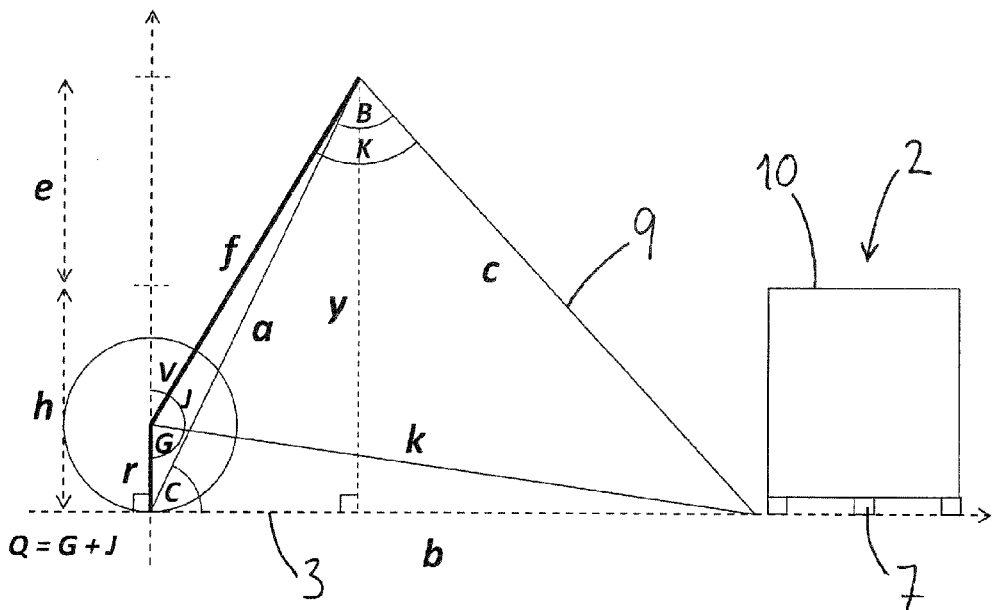
Figure 4:
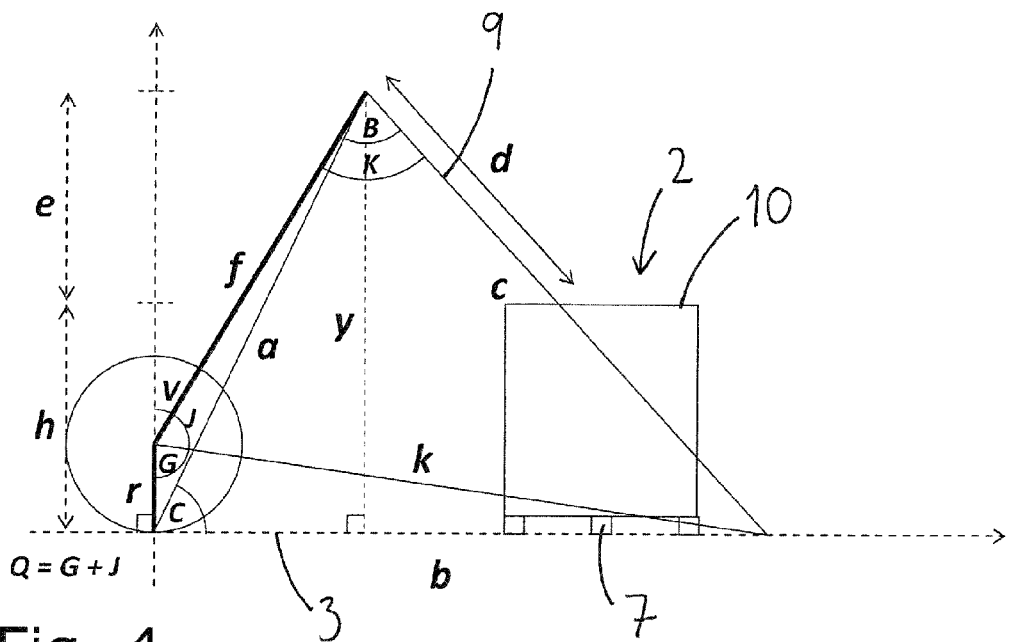
Figure 5:
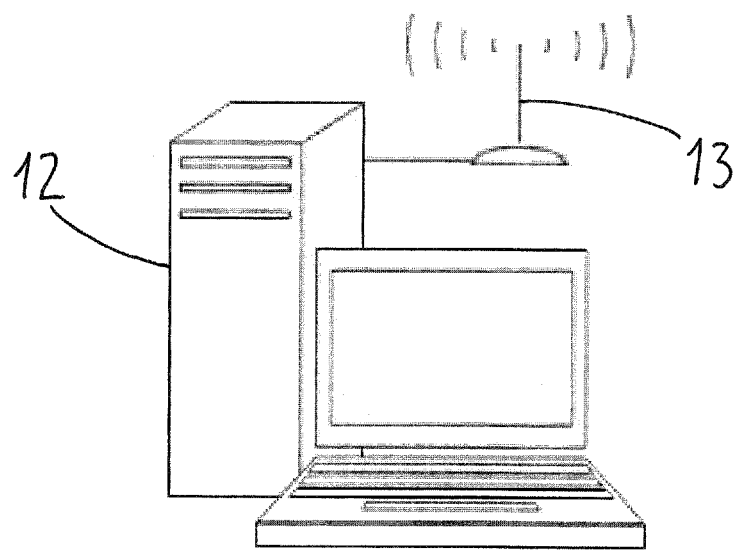

The invention will now be described in greater detail based on non-limiting exemplary embodiments and with reference to the drawings on which:

FIG. 1 schematically shows a cargo handling vehicle in the form of a fork-lift truck with a range sensor according to the invention and a palletized piece of cargo, FIG. 2 schematically shows the cargo handling vehicle of FIG. 1 with the lifting device inserted partly under the palletized piece of cargo, FIG. 3 shows a diagram illustrating the geometry of FIG. 1 with the inclination angle of the mast of the fork-lift truck exaggerated for illustration purpose, FIG. 4 shows a diagram illustrating the geometry of FIG. 2 exaggerated in the same way as FIG. 3, and FIG. 5 schematically shows a computer adapted for communication with the cargo handling vehicle.

Turning first to FIG. 1, a cargo handling vehicle 1 in the form of a fork-lift truck is shown located in front of a palletized piece of cargo 2 to be handled. Both the palletized piece of cargo 2 and the cargo handling vehicle 1 are located on a plane surface such as the tarmac or concrete covered ground a yard or the floor of a warehouse, in the following simply referred to as ground 3. The cargo handling vehicle 1 has a mast 4 along which a lifting device 5, such as the forks of a fork-lift truck, may be moved upwardly or downwardly as indicated with the double arrow 6. It should be noted, however, that the invention is not limited to cargo handling vehicles, having such a mast 4. In the situation shown in FIG. 1, the lifting device 5 has been lowered to a position where it can be inserted into the pallet 7 of the palletized piece of cargo 2. When the cargo handling vehicle 1 is moving around the yard or the warehouse without carrying a load, the lifting device would normally be raised to a slightly higher position, e.g. some 20 cm above the ground for safety reasons. The lifting device 5 would normally only be lowered to the position shown in FIG. 1 when a piece of palletized cargo 2 has to be picked up from or placed on the ground.

According to the invention the cargo handling vehicle is fitted with a range sensor 8, which is preferably located on the mast 4 at a suitable high location and with a fixed orientation with respect to the mast 4 allowing it to point downwardly towards the ground 3, as indicated by the line of sight 9 of the range sensor 8, or to the top 10 of the palletized piece of cargo 2, as illustrated in FIG. 2. The distance from the range sensor 8 along the line of sight 9 to the point where the line of sight 9 touches the ground 3 is referred to as the measuring distance in the following. It should be noted that locating the range sensor 8 on the mast is mainly preferred because it constitutes a suitable high location. The range sensor 8 may, however, also be located at any other suitable high point, e.g. on a separate, dedicated mast, or on top of the driver's cabin if possible. Evidently this will also be the case, if as described above the cargo handling vehicle, is of a type without such a mast. If a suitable high location other than the mast 4 is provided, the need for recalibration may be reduced, as will be described below.

Turning now to FIG. 2 it can be seen how the lifting device 5 has been inserted into the pallet 7 and that the line of sight 9 of the range finder now ends on the top 10 of the palletized piece of cargo 2. The range sensor 8 is preferably a laser range sensor operating in the visible spectrum, thus allowing the operator (not shown) of the cargo handling vehicle 1 to see which point the range sensor 8 is aiming at. Currently a class 2 laser range sensor of the type DT50 N1113, available from SICK Vertriebs-GmbH, Willstätterstraβe 30, 40549 Düsseldorf, Germany, having a measuring range from 0.2 to 10 m is preferred. This range sensor operates at a wavelength of 658 nm, i.e. red colour readily visible for the operator.

When aiming at a suitable point on top 10 of the palletized piece of cargo 2 a range measurement can be taken. Here it should be borne in mind, that the top surface of the palletized piece of cargo 2, may be highly irregular and not plane and horizontal as illustrated. Usually, however, the top, i.e. the highest point of the palletized piece of cargo, will be located above the middle part of the pallet, thus allowing the operator to aim at the top 10 directly when inserting the lifting device 5 with the purpose of lifting the palletized piece of cargo 2.

When aiming at the top 10 of the palletized piece of cargo 2, the operator may manually effect the range measurement by pressing a button or the like in the driver's cabin. Preferably, however, the measurement is taken automatically or semi-automatically. More specifically, if the output of the range sensor remains constant, i.e. within suitable boundaries for a predetermined period of time, it is determined by data processing means 11, e.g. forming part of a control unit in the cargo handling vehicle 1, that the top has been reached and a measurement is taken. For the time being the requirements for the precision of the height measurement are 50 mm, accordingly the boundaries could be selected to the same value. Higher precision is, however, readily available using the currently preferred laser range sensor having a distance measuring precision in the range of 1 to 3 mm. Accordingly, narrower boundaries could be used at will. If the top 10 of the palletized piece of cargo is plane and horizontal, as illustrated, the distance from the range sensor 8 to the surface will remain constant over a time period during insertion of the lifting device 5 into the pallet 7 and a measurement may automatically be taken. If the top surface is not flat, and the operator needs to identify a specific point for measurement, i.e. the top 10 of the palletized piece of cargo 2, he may stop the forward motion of the cargo handling vehicle 1 briefly, but for a sufficient time period for the data processing means in the cargo handling vehicle 1 to determine that the top has been reached, which, in turn, results in the taking of the measurement. The measurement is thus taken semi-automatically as a consequence of the detected constant distance without the operator having to actively press a button or the like. Means for the operator for rejecting incorrect measurements, be it manual, automatic or semi-automatic, are provided. E.g. pressing a button for manual measurement connected to the data processing means 11, may override a preceding automatic or semi-automatic measurement.

Preferably, the above automatic or semi-automatic measurement may be initiated automatically utilizing the fact that unloaded cargo handling vehicles 1 normally move around with the lifting device 5 lifted slightly, e.g. 20 cm above the ground. This means that when cargo handling vehicle 1 approaches the palletized piece of cargo 2, the operator lowers the lifting device 5 in order to insert it in the pallet 7. Thus, by signaling to the data processing means 11 that the lifting device 5 is passing a predetermined threshold in the downward direction, e.g. corresponding to the standard height of a pallet, the measuring process may be initiated based on the assumption that the operator of the cargo handling vehicle 1 is now going to insert the lifting device 5 under a palletized piece of cargo 2 and accordingly a height needs to be determined. Consequently, the measurement will automatically be initiated on the approach of the cargo handling vehicle 1 to the palletized piece of cargo 2, and all the operator needs to do is to aim the range sensor at the top 10 of the palletized piece of cargo 2 to be measured for a sufficient time period. It is currently preferred that the initiation of each measurement involves a recalibration of the system, based on a measurement of the distance to the ground 3 to provide a predetermined measuring distance c as will be explained below with reference to FIGS. 3 and 4.

The time consumption for the measurement may thus be reduced to the short stopping of the cargo handling vehicle 1 in the position shown in FIG. 1, during insertion of the lifting device 5 into the pallet 7, or even be zero if the palletized piece of cargo 2 has a horizontal top surface.

As indicated above, the top, i.e. the highest point of the palletized piece of cargo 2, is usually located above the middle part of the pallet, thus allowing the operator to aim at the top 10 directly when inserting the lifting device 5 with the purpose of lifting the palletized piece of cargo 2. This is evidently not always so. In practice, however, this does not constitute a problem. First of all the required 50 mm precision on the height measurement indicated above, gives the operator quite some freedom in his aim. Moreover, experience has shown that the open structure of the pallet 7 allows sufficiently many alternative options for inserting the lifting device 5, i.e. the fork of a fork-lift truck, into the pallet 7 for measurement to allow a sufficiently precise aiming at the top for practical purposes, i.e. the height determination within 50 mm for the invoicing per volume. E.g. if the top of the palletized piece of cargo 2 is arranged along one side of the pallet it may be necessary to insert the lifting device 5 in a laterally shifted manner, or insert the lifting device in the side of the pallet 7 instead of the end. Evidently, this involves an additional operation for the purpose of measurement only, as compared to the direct insertion and measuring before lifting described above. This, however, is acceptable as compared to the complicated prior art 3D equipment described above, or the full transportation to a measuring station.

In the above, reference has been made to distance measurement, though it is clear that what is of interest for calculating the estimated volume is the height of the palletized piece of cargo 2. Width and length are, of course, also of interest, but since pallets are standardized, this information is readily stored in or in conjunction with the data processing means 11. These sizes could be stored as preset values, selectable by the operator pressing of a button whenever a change to a new size takes place.

However, the distance measured at an oblique angle from the location of the range sensor 8 to the top 10 of the palletized piece of cargo 2, needs to be correctly converted to the height of the top 10 of the palletized piece of cargo 2.

Referring first to FIG. 4 this means that the height h has to be calculated from the distance d. This, in turn, necessitates a calibration of the cargo handling vehicle 1 fitted with the range sensor 8 according to the invention. This calibration may be performed by measuring the distance to the ground as illustrated in FIG. 3 to obtain a reference value c. If the cargo handling vehicle 1 is of a type where the inclination of the mast 4 cannot be changed or if the range sensor 8 is not located thereon, the calibration, at least in principle, needs only to be done once. If subsequent recalibrations are necessary, they will follow the same procedure, as will be described below.

Looking at FIG. 4 it can be realized that in addition to the measured distance d that the angles K and V, as well as the lengths of the line f and wheel radius r, are of importance for the calculation of the pallet height h. Please note that for illustration purposes angles have been exaggerated in FIGS. 3 and 4, as can be seen by comparison with FIGS. 1 and 2, where the line f has been indicated for reference.

After installation of the range sensor 8, which is preferably a laser range sensor, such as the one mentioned above, the angle K must be determined. First the distances f and r, which are constants in the equations, are measured. This may be done manually using e.g. a measuring tape or the like. Then at an arbitrary angle V the distance b on the ground is measured. This is also preferably done manually using e.g. a measuring tape or the like. These values are then entered into the data processing means, e.g. also manually via keys. The corresponding distance c to the ground is provided by the range sensor. The angle K, which is the angular orientation of the range sensor 8 with respect to the mast 4 can then be calculated by the calculation means. This procedure is referred to as "Geometric Calibration" and need only be performed once for the cargo handling vehicle 1. More specifically:

$$K = \arccos\left(\frac{f^2 + c^2 - k^2}{2 \cdot f \cdot c}\right) \quad \text{Eq. 1}$$

where $$k = \sqrt{r^2 + b^2} \quad \text{Eq. 2}$$

If the angle V of the mast 4 of the cargo handling vehicle 1 can be changed, i.e. the mast 4 tilted, it may be necessary to recalibrate the system before a measurement takes place. That is to say, if the angle V has changed to an unknown value. Currently it is therefore preferred that a distance measurement of the predetermined measuring distance c to the ground 3, is performed every time a measurement is initiated, i.e. when lowering the lifting device 5 of the cargo handling vehicle 1 in front of the palletized piece of cargo 2, as illustrated in FIG. 1. Some cargo handling vehicles 1, e.g. when also incorporating weighing means, include an inclination sensor 14 for the mast 4. In that case, the calculation means may use the value V as provided from the inclination sensor 14, for the tilt of the mast 4, in the calculations. If no inclination sensor 14 or the like is provided, a scan of the distance to the ground needs to be performed before the height measurement. Currently, however, it is preferred just to use the inclination sensor 14 for warning if the inclination of the mast has been changed during the measurement, i.e. between the position shown in FIG. 1 and the position shown in FIG. 2.

Because the orientation of the range sensor 8 with respect to the mast 4, i.e. angle K is fixed and should not change, any change of the geometry caused by the change to an unknown tilt angle V can be calculated by the calculation means. That is to say, one can see that the distances k, b, a, as well as the angles G, J, B and C, at an arbitrary angle of the mast V, can be calculated by the following:

Distance k changes according to the following equation as the tilt of the mast 4 changes:

$$k = \sqrt{c^2 + f^2 - 2 \cdot c \cdot f \cdot \cos(K)} \quad \text{Eq. 3}$$

Distance b changes according to the following equation as the tilt of the mast 4 changes:

$$b = \sqrt{k^2 - r^2} \quad \text{Eq. 4}$$

Angle G changes according to the following equation as the tilt of the mast 4 changes:

$$G = \arctan\left(\frac{b}{r}\right) \quad \text{Eq. 5}$$

Angle J changes according to the following equation as the tilt of the mast 4 changes:

$$J = \arccos\left(\frac{f^2 + k^2 - c^2}{2 \cdot f \cdot k}\right) \quad \text{Eq. 6}$$

Distance a changes according to the following equation as the tilt of the mast 4 changes:

$$a = \sqrt{f^2 + r^2 - 2 \cdot f \cdot r \cdot \cos(Q)} \quad \text{Eq. 7}$$

where $$Q = G + J \quad \text{Eq. 8}$$

Angle B changes according to the following equation as the tilt of the mast 4 changes:

$$B = \arccos\left(\frac{a^2 + c^2 - b^2}{2 \cdot a \cdot c}\right) \quad \text{Eq. 9}$$

or slightly rewritten $$B = \arccos\left(\frac{a^2 + c^2 + r^2 - k^2}{2 \cdot a \cdot c}\right) \quad \text{Eq. 10}$$

Likewise the angle C changes according to the following equation as the tilt of the mast 4 changes:

$$C = \arccos\left(\frac{a^2 + b^2 - c^2}{2 \cdot a \cdot b}\right) \quad \text{Eq. 11}$$

or by use of the sine relationship $$C = \arcsin\left(\frac{c}{b} \cdot \sin(B)\right) \quad \text{Eq. 12}$$

Provided that the angle V is not changed again, the height of the top 10 of the palletized cargo 2 may now be calculated by data processing means 11 based on the measured distance d, i.e. the measured distance from the range sensor 8 to the top 10 of the palletized piece of cargo 2 along the line of sight 9 as shown in FIG. 3.

Since the angle V has not changed, the elevation y of the range sensor 8 above the ground 3 is given by:

$$y = a \cdot \sin(C) \quad \text{Eq. 13}$$

Accordingly, the vertical distance e between the range sensor 8 and the top 10 of the palletized piece of cargo 2 is given by:

$$e = y \cdot \frac{d}{c} \qquad \text{Eq. 14}$$

From which the height h of the pallet can easily be calculated as the difference:

$$h = y - e \qquad \text{Eq. 15}$$

For known values of the length and the width of the pallet, the estimated volume may now be calculated as:

$$\text{volume} = l\text{pal} \cdot w\text{pal} \cdot h \qquad \text{Eq. 16}$$

where lpal is the length of the pallet and wpal is the width of the pallet.

The necessary data about distances, widths, lengths, angles, etc. recited above may readily be stored in or in connection with the data processing means 11, as may the results of the calculations. It is, however, preferred to also transmit at least the results of the calculations via wireless communication means 13, such as WLAN or the like, to a central computer 12 shown in FIG. 5.

Apart from storing the above-mentioned data, the data processing means 11 may also store data about standard density factors of cargo allowing the data processing means to calculate an estimated weight corresponding to the estimated volume. If the cargo handling vehicle 1 is furthermore equipped with weighing means, e.g. of the type disclosed in WO-A-2006/128454, the data processing means may furthermore be adapted to make a decision whether the shipping of the piece of cargo 2 should be invoiced per volume or per weight. Thus, the data processing means 11 may be adapted to determine which one of the estimated weight of said piece of cargo 2 and the actual weight of said piece of cargo 2 constitutes the larger.

The result of this decision together with the value may, like all other relevant data, be transmitted via the wireless communication means 13 to the central computer 12 shown on FIG. 5. Preferably, the data processing means 11 also comprises storage means for storing at least temporarily the data and the results, e.g. for later transmission, in case the wireless communication is not available. Though it is preferred to do the calculations in the data processing means 11, the skilled person will understand that at least some of the calculations may be performed remotely, e.g. in the central computer 12.

With the invention there is thus provided a simple and efficient way of estimating volume of cargo during the handling thereof, and without interfering with the natural routines of doing so. The skilled person will understand that numerous modifications and variants of the method and the cargo handling vehicle may be devised without deviating from the scope of the claims.

The invention claimed is:

1. A method for estimating a volume of a piece of cargo having a known width and length and a top of an unknown height, said method comprising:
   attaching a laser range sensor on a cargo handling vehicle having a lifting device,
   placing said piece of cargo on a surface, said surface having a desired measuring distance from said laser range sensor,
   directing the laser range sensor towards the top of said piece of cargo,
   measuring a distance to the top of said piece of cargo using the laser range sensor,
   calculating a height of said piece of cargo based on said distance,
   calculating the estimated volume of said piece of cargo based on said known length and width and said calculated height.

2. The method according to claim 1, wherein the measuring is performed automatically when said distance has remained constant within a desired interval for a desired period of time.

3. The method according to claim 2, wherein the automatic measurement is automatically initiated when the lifting device passes a threshold in the downward direction.

4. The method according to claim 1, wherein the measuring is preceded by a measuring of said desired measuring distance to the surface in order to obtain a distance reference value, and wherein the calculating calculates the height of said piece of cargo based on the distance reference value.

5. The method according to claim 4, further comprising:
   providing an inclination sensor on a mast along which the lifting device is movable,
   obtaining from said sensor an inclination value for said mast, and
   using said inclination value in the calculation of the height of said cargo if the inclination has changed after said distance reference value was measured.

6. The method according to claim 1, further comprising:
multiplying said estimated volume with a density factor to obtain an estimated weight of said piece of cargo.

7. The method according to claim 6, further comprising:
   determining an actual weight of said piece of cargo on said cargo handling vehicle.

8. The method according to claim 7, further comprising:
selecting the larger of said estimated weight of said piece of cargo and said actual weight.

9. The method according to claim 1, further comprising:
   providing a device for determining an actual weight of said piece of cargo on said cargo handling vehicle.

10. A cargo handling vehicle comprising a lifting device, wherein said cargo handling vehicle comprises:
    a laser range sensor attached to said cargo handling vehicle at a position and configured to measure a distance to a top of a piece of cargo, and
    a processor configured to,
       calculate a height of said piece of cargo based on said distance to the top of the piece of cargo, and
       calculate an estimated volume of said piece of cargo based on a known length and width and said calculated height.

11. The cargo handling vehicle according to claim 10, wherein the processor is configured to,
    detect when said distance to the top of the piece of cargo has remained constant within a desired interval for a desired period of time, and automatically perform said measurement upon expiry of said time period.

12. The cargo handling vehicle according to claim 11, wherein the processor is configured to,
    detect the lifting device passing a desired threshold in the downward direction, and
    automatically initiate said measurement upon such passage.

13. The cargo handling vehicle according to claim 10, wherein the laser range sensor is configured to measure a desired measuring distance to a surface in order to obtain a distance reference value, and wherein the processor is configured to use the calculate the height of said piece of cargo based on the distance reference value.

14. The cargo handling vehicle according to claim 13, further comprising:
   a mast along which the lifting device is movable; and
   an inclination sensor on said mast for obtaining an inclination value for said mast, wherein the processor is configured to calculate the height of said cargo using said inclination value if the inclination has changed after said distance reference value was measured.

15. The cargo handling vehicle according to claim 14, wherein said laser range sensor is arranged on said mast.

16. The cargo handling vehicle according to claim 10, further comprising:
   a memory configured to store a desired density factor, wherein the processor is configured to multiply said estimated volume with said density factor to obtain an estimated weight of said piece of cargo.

17. The cargo handling vehicle according to claim 16, wherein the processor is configured to determine an actual weight of said piece of cargo on said cargo handling vehicle.

18. The cargo handling vehicle according to claim 17, wherein the processor is configured to select the larger of said estimated weight of said piece of cargo and said actual weight.

19. The cargo handling vehicle according to claim 10, wherein the processor is configured to determine an actual weight of said piece of cargo on said cargo handling vehicle.

20. A cargo handling vehicle comprising a lifting device, wherein said cargo handling vehicle comprises:
   a laser range sensor attached to said cargo handling vehicle at a position and configured to measure a distance to a single point on a top of a piece of cargo, and
   a processor configured to,
      calculate a height of said piece of cargo based on said distance to the single point on the top of the piece of cargo, and
      calculate an estimated volume of said piece of cargo based on a known length and width and said calculated height.

* * * * *